(No Model.) 10 Sheets—Sheet 2.

H. HAMMOND.
FORGING MACHINE.

No. 322,929. Patented July 28, 1885.

Witnesses: Frank H. Pierpont, John Henry Brocklesby

Inventor: Henry Hammond by Albert H. Walker, his Attorney

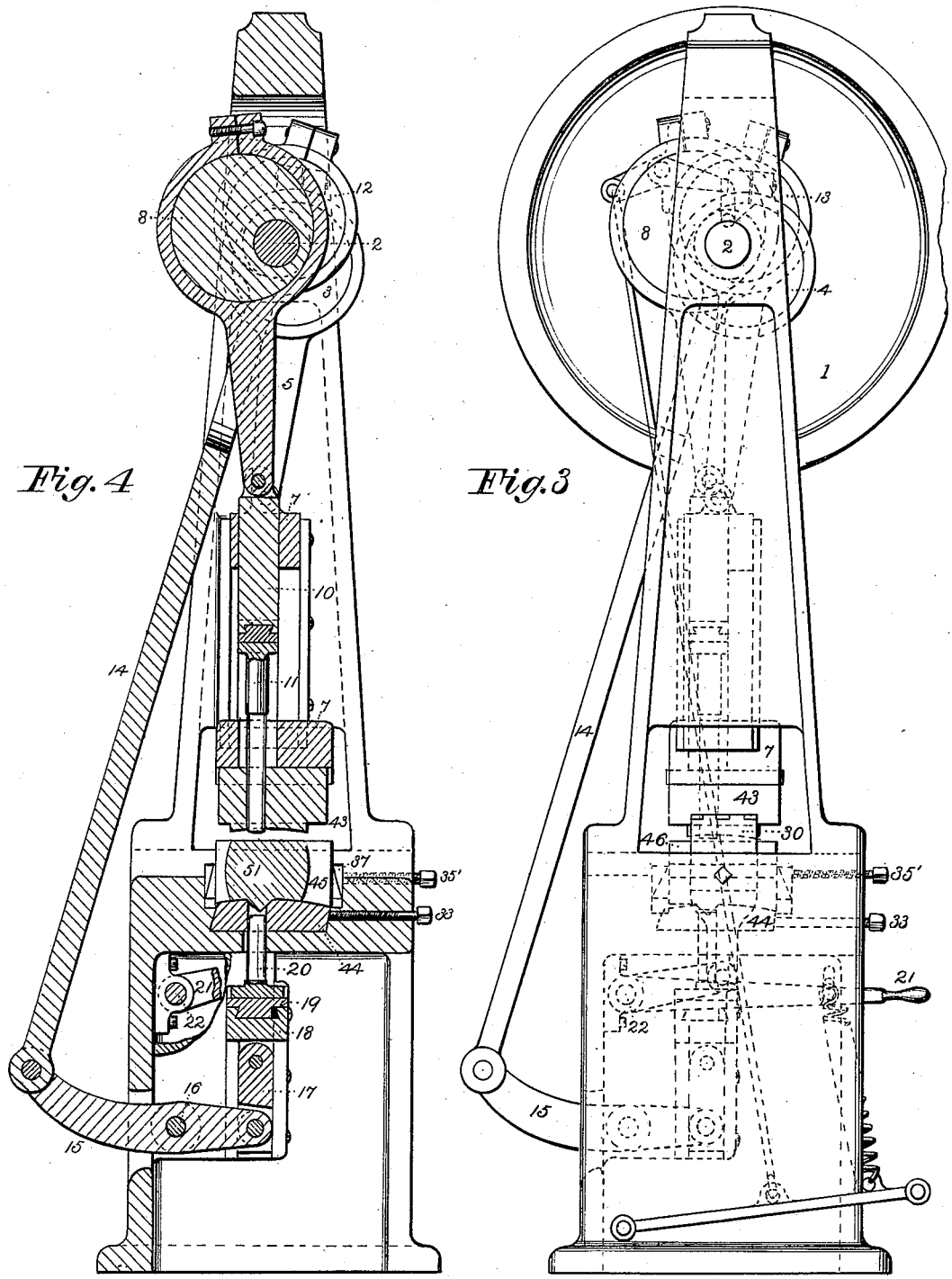

(No Model.)
10 Sheets—Sheet 4.
H. HAMMOND.
FORGING MACHINE.
No. 322,929. Patented July 28, 1885.
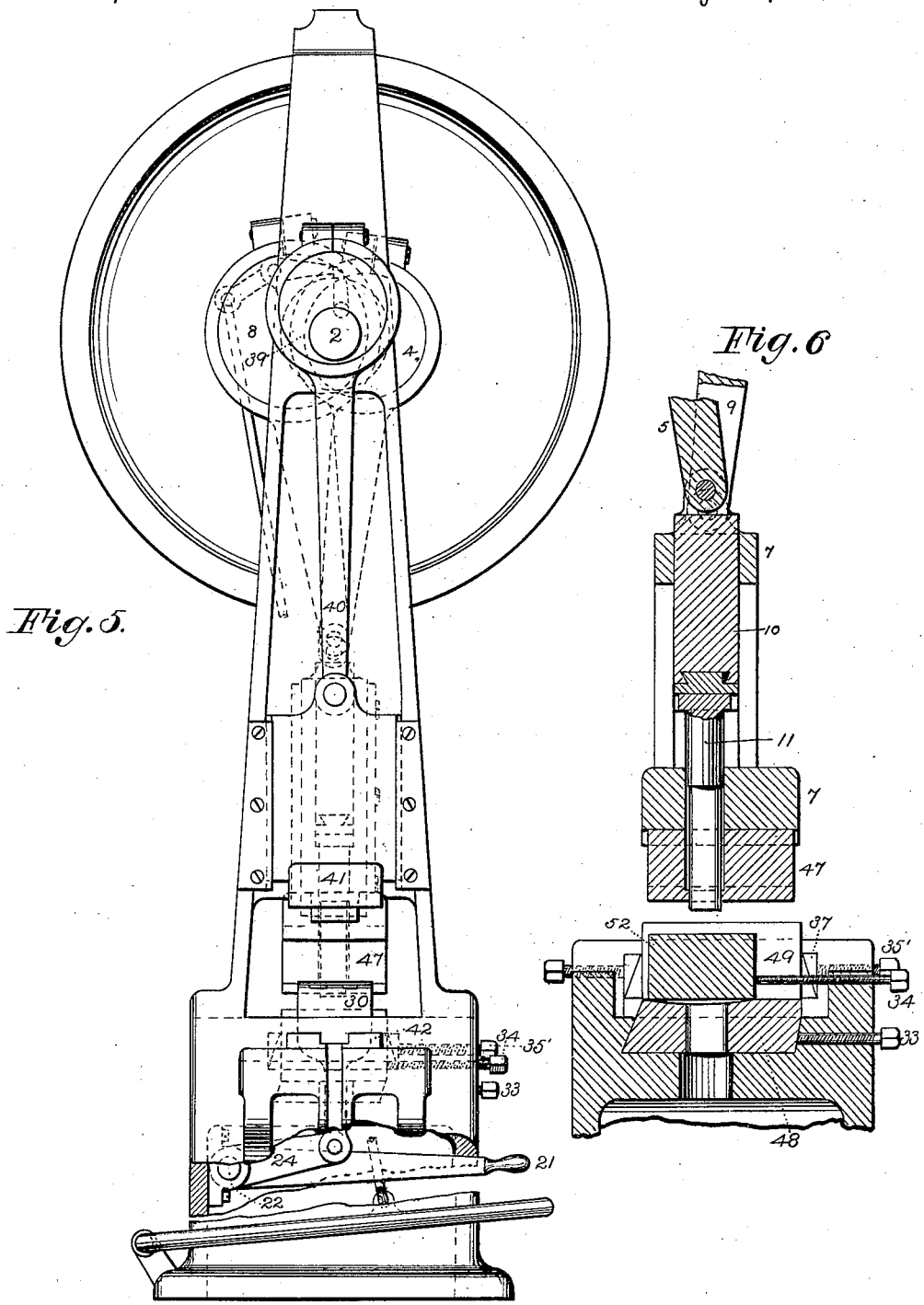
Witnesses:
Frank H. Pierpont
Jno Henry Bucklesby
Inventor:
Henry Hammond
by Albert H. Walker his Attorney (No Model.) 10 Sheets—Sheet 5.
H. HAMMOND.
FORGING MACHINE.
No. 322,929. Patented July 28, 1885.
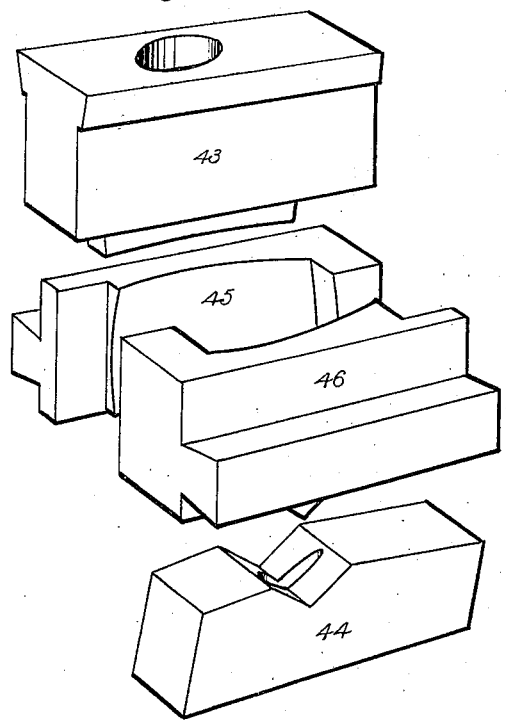
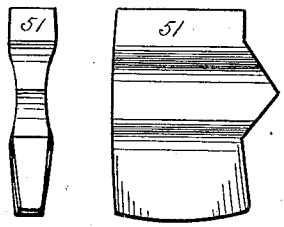
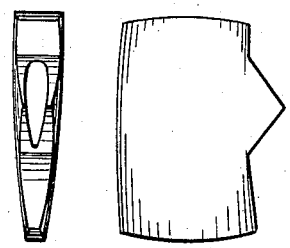
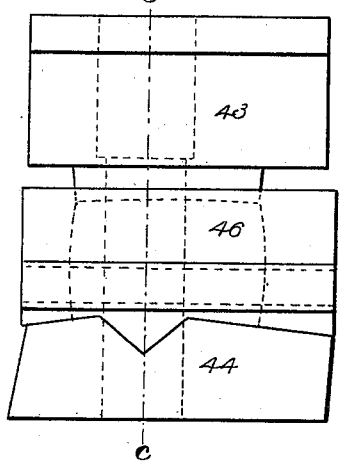
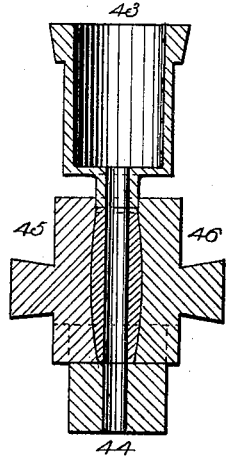
Witnesses:
Frank H. Pierpont
Jno Henry Brocklesby
Inventor:
Henry Hammond
by Albert H. Walker his Attorney (No Model.) 10 Sheets—Sheet 6.

H. HAMMOND.
FORGING MACHINE.

No. 322,929. Patented July 28, 1885.

Witnesses:
Frank H. Pierpont
John Henry Brocklesby

Inventor:
Henry Hammond
by Albert H. Walker his Attorney (No Model.) 10 Sheets—Sheet 7.
H. HAMMOND.
FORGING MACHINE.

No. 322,929. Patented July 28, 1885.

Witnesses: Inventor:
Frank H. Pierpont Henry Hammond
John Henry Brocklesby by Albert H. Walkinshaw Atty (No Model.) 10 Sheets—Sheet 8.
H. HAMMOND.
FORGING MACHINE.
No. 322,929. Patented July 28, 1885.
*Fig. 28*
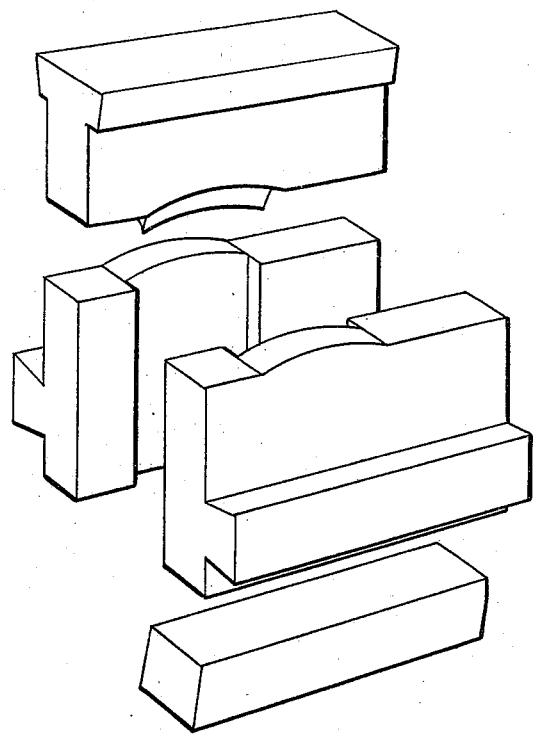
*Fig. 31* *Fig. 32*
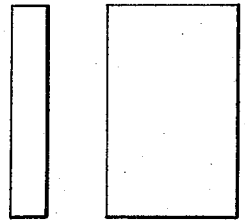
*Fig. 33* *Fig. 34*
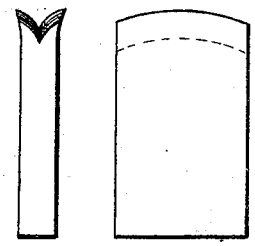
*Fig. 29*
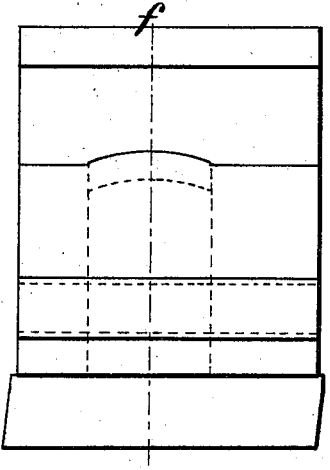
*Fig. 30*
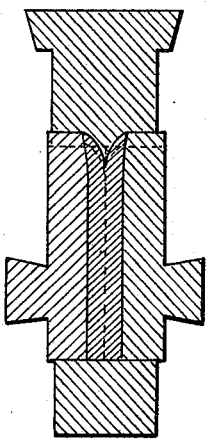
Witnesses:
Frank H. Pierpont
John Henry Brocklesby
Inventor:
Henry Hammond
by Albert H. Walker his Attorney (No Model.) 10 Sheets—Sheet 9.
H. HAMMOND.
FORGING MACHINE.
No. 322,929. Patented July 28, 1885.
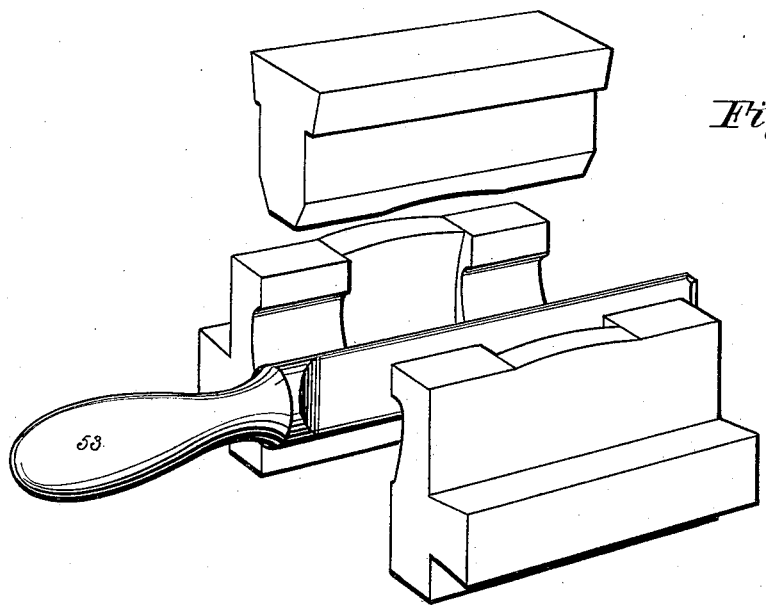
Fig. 35.
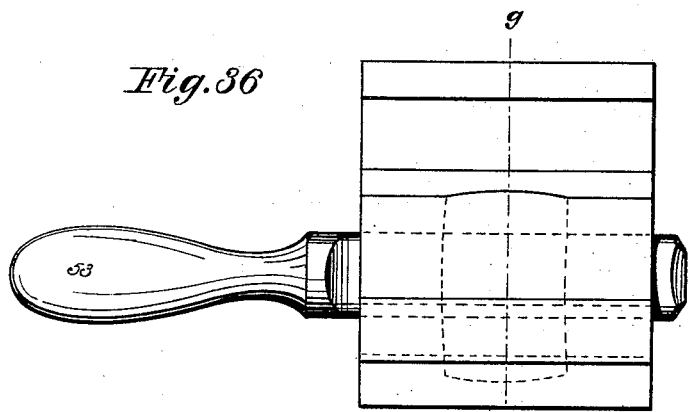
Fig. 36.
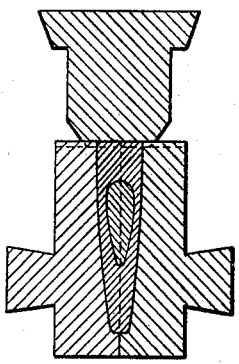
Fig. 37.
 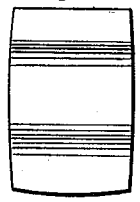  
Fig. 38. Fig. 39. Fig. 40. Fig. 41.
Witnesses: Inventor:
Frank H. Pierpont Henry Hammond
John Henry Brocklesby by Albert H. Walker his Att'y (No Model.)  
10 Sheets—Sheet 10.

H. HAMMOND.
FORGING MACHINE.

No. 322,929. Patented July 28, 1885.

Witnesses:  
Frank H. Pierpont  
John Henry Brocklesby

Inventor:  
Henry Hammond  
by Albert H. Walker his Atty

UNITED STATES PATENT OFFICE.

HENRY HAMMOND, OF NEW HAVEN, CONNECTICUT.

FORGING-MACHINE.

SPECIFICATION forming part of Letters Patent No. 322,929, dated July 28, 1885.

Application filed December 26, 1884. (No model.)

*To all whom it may concern:*

Be it known that I, HENRY HAMMOND, of New Haven, Connecticut, have invented a new and useful Forging-Machine, adapted to the manufacture of axes and other articles of malleable metal, and of which the following description and claims constitute the specification, and which is illustrated by the accompanying ten sheets of drawings.

This machine is adapted to press and cut articles of malleable metal into desired forms by means of dies and punches operated by mechanism hereinafter described.

Figure 1:
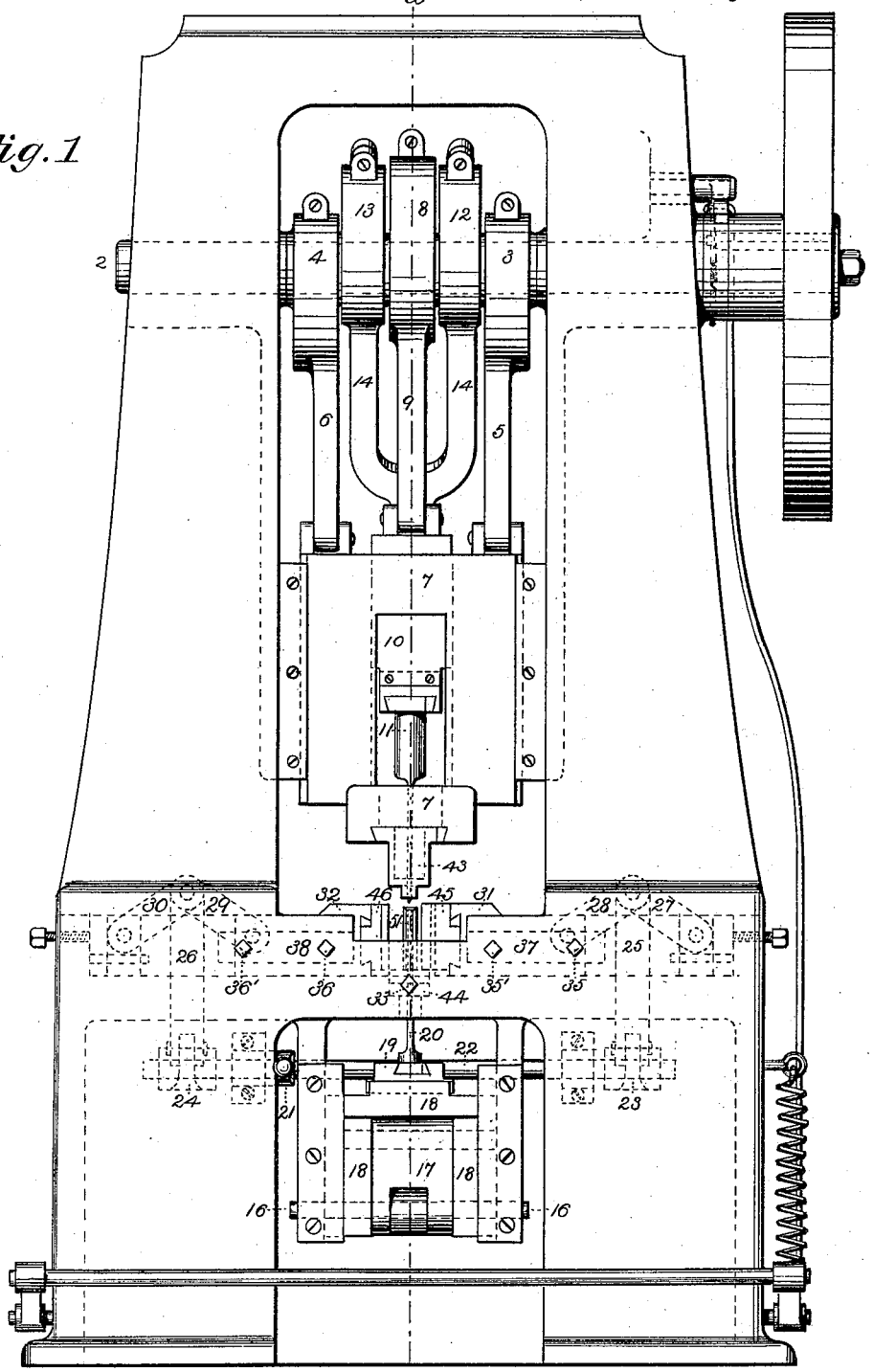
Figure 2:
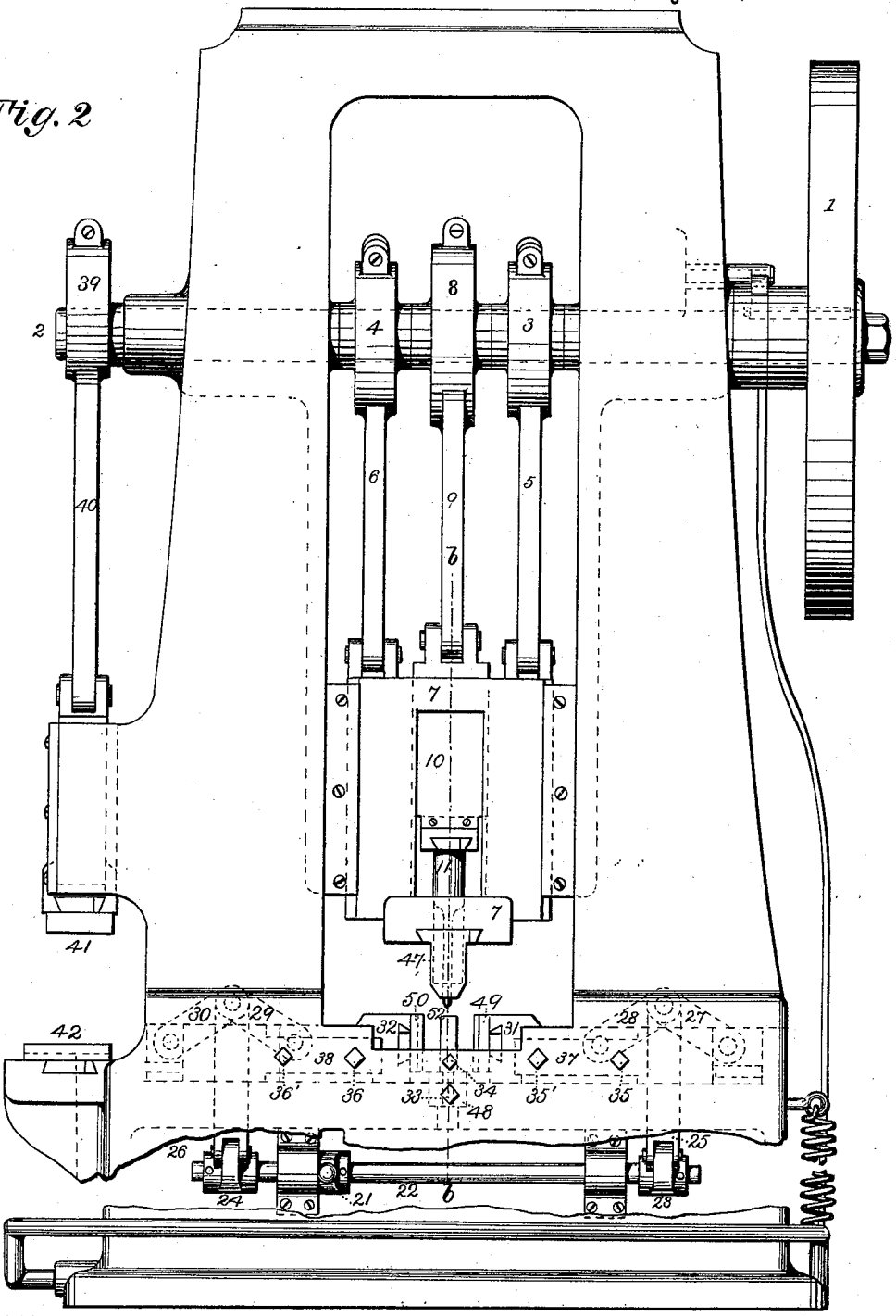
Figure 14:
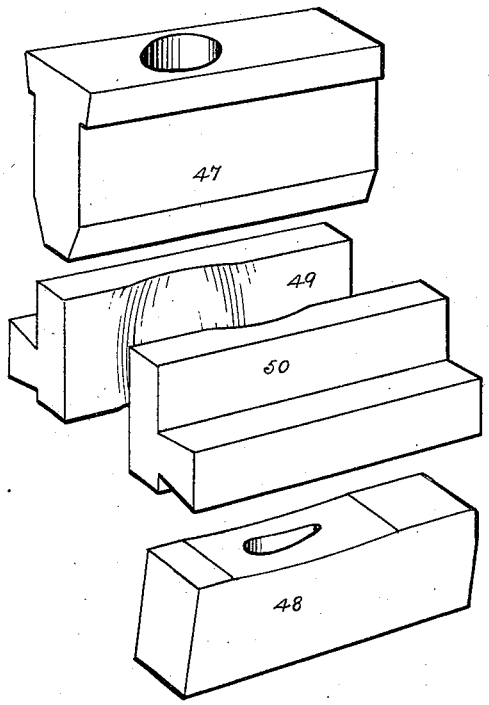
Figures 17, 18:
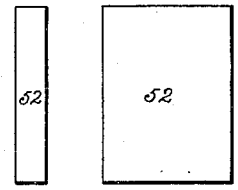
Figures 19, 20:
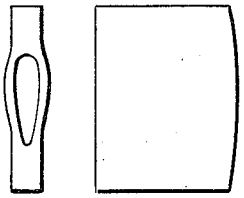
Figure 15:
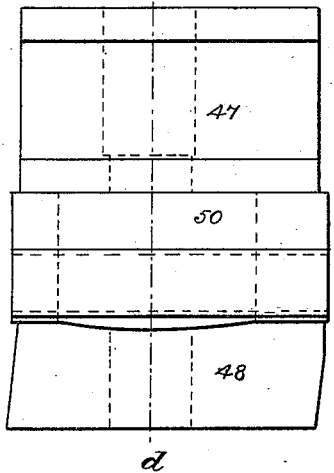
Figure 16:
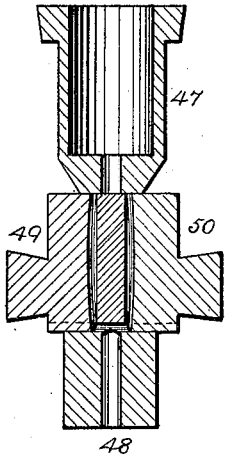
Figure 21:
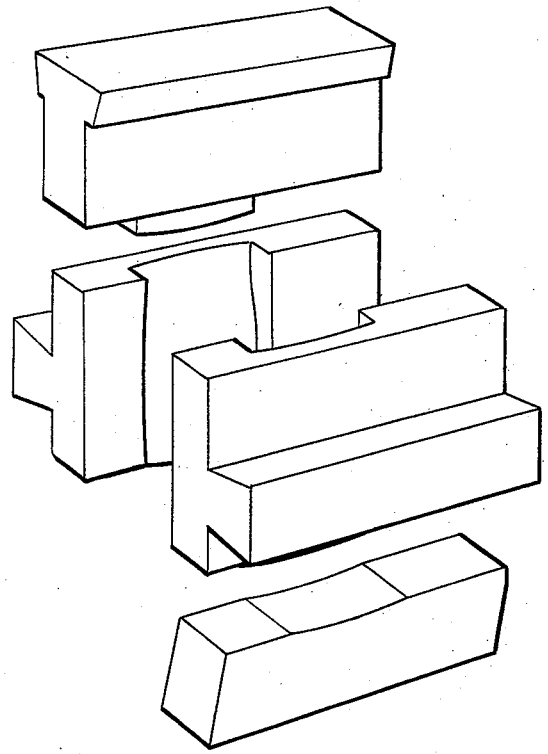
Figures 24, 25:
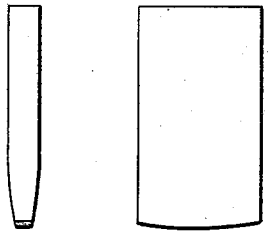
Figures 26, 27:
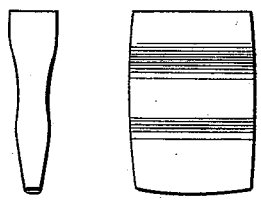
Figure 22:
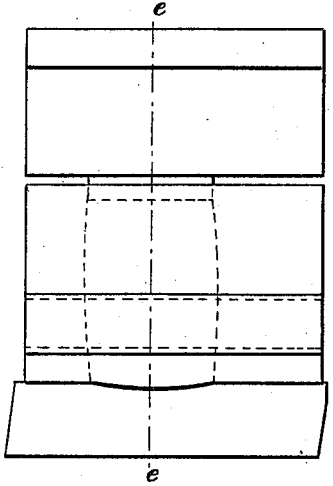
Figure 23:
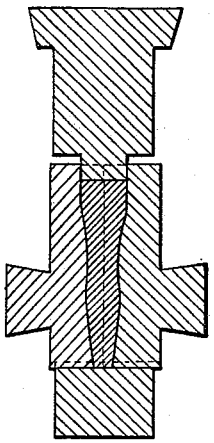

Figure 1 of the drawings is a front view of the machine without the side press, and Fig. 2 is a front view of the machine with the side press, but without the lower punch and without the mechanism which works the latter. Fig. 3 is a side view of what is shown in Fig. 1, and Fig. 4 is a vertical central cross-section on the line $a\,a$ of Fig. 1. Fig. 5 is a side view of what is shown in Fig. 2, while Fig. 6 is a vertical cross-section on the line $b\,b$ of Fig. 2. Fig. 7 is a perspective view of a set of dies used in the machine and shown there in Fig. 1. Fig. 8 is a side view of the dies of Fig. 7 when in junction with each other and with the ax-poll of Figs. 12 and 13 between them. Fig. 9 is a vertical cross-section on the line $c\,c$ of Fig. 8. Figs. 10 and 11 are edge and side views, respectively, of an ax-poll blank prepared for the operation of the dies of Fig. 7. Figs. 12 and 13 are edge and side views, respectively, of that blank after it has been pressed by those dies and by the punches working therein into the form of an ax-poll. Fig. 14 is a perspective view of a set of dies used in the machine and shown there in Fig. 2. Fig. 15 is a side view of the dies of Fig. 14 in junction with each other and with the rectangular block of metal of Figs. 17 and 18 between them. Fig. 16 is a vertical section on the line $d\,d$ of Fig. 15. Figs. 17 and 18 are edge and side views, respectively, of a rectangular block of metal suitable to be operated upon by the two punches working through the upper and lower dies, respectively. Figs. 19 and 20 are edge and side views, respectively, of that block after it has been thus operated upon. Fig. 21 is a perspective view of a set of dies which may be used in the machine in the place of the set of Fig. 14, and which are adapted to press the ax-poll blank of Figs. 24 and 25 into the form of the concaved ax-poll of Figs. 26 and 27. Fig. 22 is a side view of the dies of Fig. 21 when in junction with each other and with the ax-poll blank of Figs. 26 and 27 between them. Fig. 23 is a vertical cross-section on the line $e\,e$ of Fig. 22. Figs. 24 and 25 are edge and side views, respectively, of an ax-poll blank prepared for the operation of the dies of Fig. 21; and Figs. 26 and 27 are views of that blank after it has been pressed by those dies into the concaved form shown in those figures. Fig. 28 is a perspective view of a set of dies which may be used in the machine in the place of any other set, and which are adapted to split the upper end of the rectangular metal block of Figs. 31 and 32, and also to give the split edge thereof the convex curved form shown in Figs. 33 and 34. Fig. 29 is a side view of the dies of Fig. 28 when in junction with each other and with the split-edge block of Figs. 33 and 34 between them. Fig. 30 is a vertical cross-section on the line $f\,f$ of Fig. 29. Figs. 31 and 32 are edge and side views, respectively, of a block of metal suitable to be operated upon by the dies of Fig. 28; and Figs. 33 and 34 are edge and side views, respectively, of that block after it has been operated upon by those dies. Fig. 35 is a perspective view of a set of dies which may be used in the machine in the place of any other set, and which are adapted to press the ax-poll blank of Figs. 38 and 39 into the form of the ax-poll of Figs. 40 and 41. Fig. 36 is a side view of the dies of Fig. 35 when in junction with each other and with the ax-poll of Figs. 40 and 41 between them. Fig. 37 is a vertical section on the line $g\,g$ of Fig. 36. Figs. 38 and 39 are edge and side views, respectively, of an ax-poll blank prepared for the operation of the dies of Fig. 35; and Figs. 40 and 41 are edge and side views, respectively, of that blank after it has been pressed by those dies into the form of an ax-poll. Figs. 42, 43, 44, 45, 46, 47, and 48, respectively, correspond with Figs. 35, 36, 37, 38, 39, 40, and 41 in all respects, except that the blank operated upon is an ax-blank instead of an ax-poll blank, and the thing produced is an ax instead of an ax-poll, and the dies producing it vary accordingly in form.

The dies of Fig. 7 are specially adapted to use in the machine as shown in Figs. 1, 3, and 4, because the lower die of that set has a perpendicular hole for the passage of the lower punch.

The dies of Fig. 14 are specially adapted to use in the machine as shown in Figs. 2, 5, and 6, because the lower die of that set has a hole for the reception of the lower end of the upper punch.

The dies of Figs. 21, 28, 35, and 42 may either of them be used in the machine when the punch or punches are removed therefrom, as the case may be.

The pulley 1 runs the machine through the shaft 2, or runs loosely upon that shaft, by means of the devices indicated in these drawings, and elaborately described and illustrated in another application of mine for Letters Patent of the United States for another new and useful forging-machine, executed on the same day with this application.

The eccentrics 3 and 4 upon the shaft 2, acting through the rods 5 and 6, give reciprocating motion to the gate or die holder 7, while the eccentric 8, through the rod 9 and the punch-holder 10, gives reciprocating motion to the upper punch, 11.

The eccentrics 12 and 13, through the bifurcated rod 14, work the lever 15, which turns on the fulcrum 16. The inner end of that lever is pivoted between the forks of the bifurcated link 17, which link is pivoted between the forks of the bifurcated slide 18.

The punch-holder 19 is adjustable lengthwise of the machine in the dovetail recess on the top of the slide 18, and the head of the lower punch, 20, is adjustable crosswise of the machine in the dovetail recess on the top of the punch-holder 19.

The arm 21 is keyed to the shaft 22, as also are the arms 23 and 24, which latter are pivoted to the rods 25 and 26, respectively. The rod 25 has its upper end pivoted to the links 27 and 28, while the rod 26 has its upper end pivoted to the similar links 29 and 30. The outer ends of the links 27 and 30, respectively, are pivoted to the frame of the machine, or to adjustable slides, as shown in Fig. 1, while the inner ends of the links 28 and 29, respectively, are pivoted to the horizontal slides 31 and 32. To the inner ends of the latter slides the two side dies of either set of dies represented in the drawings, or of any other suitable set of dies, are attached by a dovetail union or otherwise. The lower die is shown in Figs. 4 and 6 as held in place by the set-screw 33.

The set-screw 34 serves as an adjustable gage for placing the blank to be operated upon at the proper place between the side dies of Fig. 14 when those dies are used in the machine.

The pairs of set-screws 35 35' and 36 36' are adapted to adjust the play of the slides 31 and 32, respectively, by pressing against the triangular gibs 37 and 38, respectively.

Figures 47, 48:
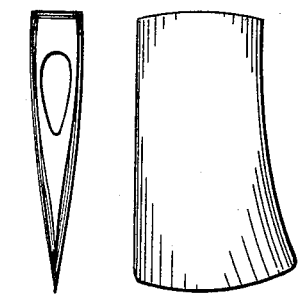
Figure 43:
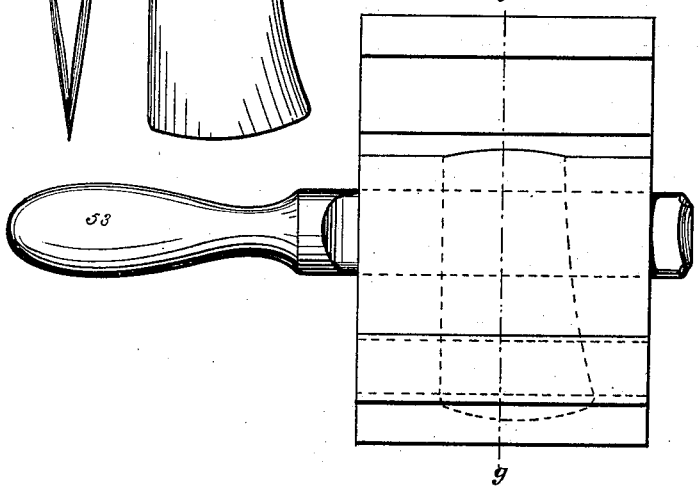
Figure 44:
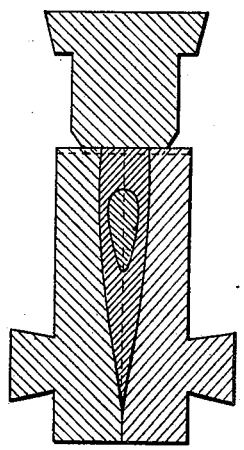

The eccentric 39, through the rod 40, works the press 41 over the bed 42, which bed is adapted to receive the blank of Fig. 41 or that of Fig. 47, with the ax-pin 53 fastened therein, and to hold that blank while the press 41, by descending upon the smaller end of the ax-pin, forces it out of the eye of the ax or ax-poll, as the case may be, and down through the opening in the bed 42.

The upper die, 43, of the set of dies shown in Fig. 7 is shown in place in Figs. 1, 3, and 4, as also are the lower die, 44, and the side dies, 45 and 46, of the same set. The upper die, 47, of the set of dies shown in Fig. 14 is likewise shown in position in the machine in Figs. 2, 5, and 6, as also are the lower die, 48, and the side dies, 49 and 50, of the set shown in Fig. 14. The blank 51 of Figs. 10 and 11 is shown in position in the machine in Figs. 1 and 4, and the blank 52 of Figs. 17 and 18 is shown in position in the machine in Figs. 2 and 6.

Figure 42:
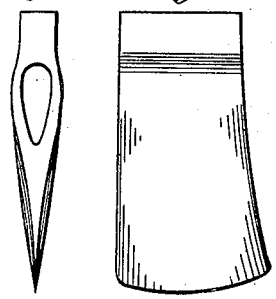
Figures 45, 46:
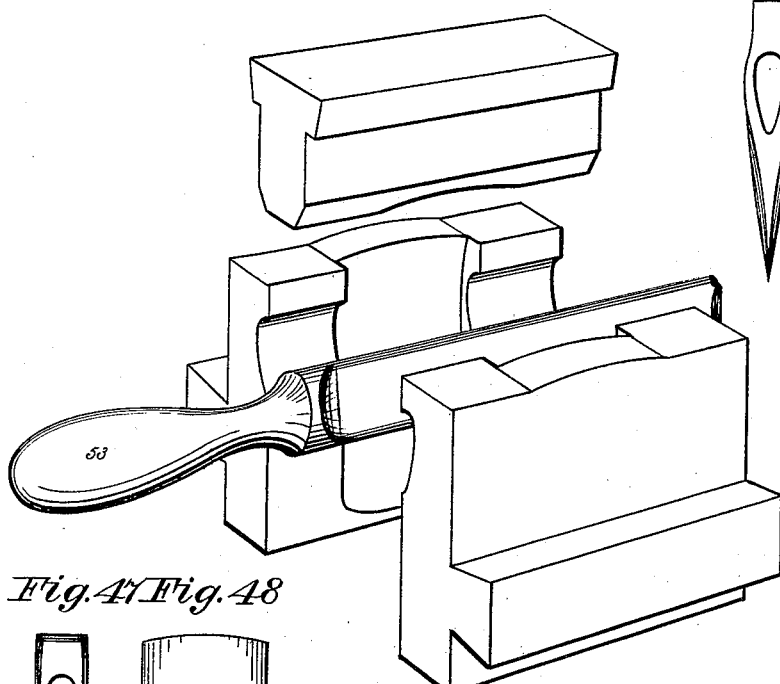

The mode of operation of this machine is as follows: The dies of Fig. 7 being fixed in the machine, the blank of Fig. 51 is placed between them. Then the lever 21 is depressed by the hand of the operative. The links 27, 28, 29, and 30 are thus brought down to an almost horizontal position, and the blank is thus clasped with great power between the side dies. Then the operative, by depressing the treadle and allowing it to rise again, connects the shaft 2 with the pulley 1, so as to cause the shaft to revolve once. That revolution works the eccentrics 3 and 4, and through them the upper die-holder, 7, and works the eccentric 8, and through it the upper punch, 11, and works the eccentrics 12 and 13, and through them the bifurcated rod 14, the lever 15, the link 17, the slide 18, the lower punch-holder, 19, and the lower punch, 20. These movements are so timed by the adjustments of the various eccentrics that the upper die first presses upon the blank, and the upper punch penetrates it, and the lower punch penetrates the blank till it nearly meets the upper punch, when it is withdrawn, followed by the upper punch, which latter passes down through the blank, and is then withdrawn therefrom by means of the stripping operation of the upper die, which results from its moving upward slower than the upper punch. At the end of the revolution of the shaft 2 the machine stops, and the operative raises the lever 21, and then withdraws the article operated upon. This he then replaces with another blank, and the operation is repeated as often as desired. When the lower punch is not wanted, the machine may be constructed without it, and without the eccentrics 12 and 13, and without the mechanism intermediate those eccentrics and that punch; or, if a machine containing those parts is in use, they may be partly or wholly dismantled, and the machine be used as if it did not contain them. When the dies of Fig. 35 or those of Fig. 42 are used, the eye of the blank may be larger than the desired eye of the ax-poll or ax, and may be irregular in form. The ax-pin 53 is inserted therein, and the blank and the ax-pin are then placed and clamped between the two side dies. Then the upper die, descending, upsets the blank, and thus forces its outer surfaces into conformity with the shape of the dies, and also forces the eye into conformity with the shape and size of the ax-pin, and thus completes the ax-poll or the ax.

I claim as my invention—

1. The combination of the rod 14, worked by the shaft 2, with the lever 15, turning on the fulcrum 16, and with the link 17, working the slide 18, all substantially as described.

2. The combination of the slide 18 with the punch-holder 19, adjustable thereon, and with the punch 20, adjustable on the punch-holder, all substantially as shown and described.

3. The combination of the shaft 22, worked by the lever 21, and having the arms 23 and 24, with the rods 25 and 26, and with the links 27 and 28, working the slide 31, and with the links 29 and 30, working the slide 32, all substantially as described.

4. The combination of the punches 11 and 20, driven by one shaft, and so working in opposite directions that the punch 20 penetrates the blank till it almost meets the punch 11, when it is withdrawn, followed by the punch 11, which latter passes down through the blank, and thus enlarges the eye to the desired size from end to end, all substantially as described.

5. A die of four sections, the bottom one of which is stationary, and the two side sections of which are adapted to move together along the upper surface of the bottom section, and are provided with shoulders to do the work of end sections, and the top section of which is adapted to work between the two side sections, substantially as shown in Fig. 28 of the accompanying drawings.

6. The combination of the concave side dies, 49 and 50, adapted to hold a metal blank between them, with a punch or punches adapted to split that blank from edge to edge, and thus to force its sides outwardly to fill the concavities in the dies, all substantially as shown and described.

7. A die of three sections, two of which are adapted to hold a perforated ax-blank in a cavity between them, and to form its sides and edges, and to hold an ax-pin exactly central relatively to the thickness of that cavity, and exactly placed relatively to its length, and the other section of which die is adapted to press the ax-blank into conformity with such die and such ax-pin, all substantially as described, and as shown in Fig. 42 of the accompanying drawings.

HENRY HAMMOND.

Witnesses:
ALBERT H. WALKER,
FRANK H. PIERPONT.